(12) United States Patent
Johnson et al.

(10) Patent No.: US 7,205,906 B2
(45) Date of Patent: Apr. 17, 2007

(54) VARIABLE ENHANCED GROUND PROXIMITY WARNING SYSTEM LOOK-AHEAD OFFSET AND SUB-OFFSET

(75) Inventors: Steve C. Johnson, Issaquah, WA (US); Yasuo Ishihara, Kirkland, WA (US); Kevin J Conner, Kent, WA (US)

(73) Assignee: Honeywell International Inc., Morristown, NJ (US)

( * ) Notice: Subject to any disclaimer, the term of this patent is extended or adjusted under 35 U.S.C. 154(b) by 674 days.

(21) Appl. No.: 09/916,630

(22) Filed: Jul. 27, 2001

(65) Prior Publication Data

US 2002/0097169 A1 Jul. 25, 2002

Related U.S. Application Data

(60) Provisional application No. 60/263,978, filed on Jan. 24, 2001.

(51) Int. Cl.
*G08B 23/00* (2006.01)
(52) U.S. Cl. .................. 340/970; 340/988; 701/213
(58) Field of Classification Search ........ 340/945–980, 340/988–995; 701/200, 201, 213
See application file for complete search history.

(56) References Cited

U.S. PATENT DOCUMENTS

| | | | |
|---|---|---|---|
| 4,567,483 A * | 1/1986 | Bateman et al. ............ 340/970 |
| 4,646,244 A * | 2/1987 | Bateman et al. ............ 701/301 |
| 4,675,823 A * | 6/1987 | Noland ........................ 701/300 |
| 5,442,556 A * | 8/1995 | Boyes et al. ..................... 701/9 |
| 5,839,080 A * | 11/1998 | Muller et al. ................... 701/9 |
| 6,088,634 A | 7/2000 | Muller et al. ................... 701/9 |
| 6,445,310 B1 * | 9/2002 | Bateman et al. ............ 340/970 |
| 6,456,941 B1 * | 9/2002 | Gutierrez .................... 701/301 |
| 6,484,071 B1 * | 11/2002 | Conner et al. .................. 701/9 |
| 6,606,034 B1 * | 8/2003 | Muller et al. ............... 340/970 |

FOREIGN PATENT DOCUMENTS

WO WO 00 47948 A 8/2000
WO WO 00 48050 A 8/2000

* cited by examiner

*Primary Examiner*—Phung T. Nguyen
(74) *Attorney, Agent, or Firm*—Black Lowe & Graham PLLC

(57) ABSTRACT

The present invention includes a system, method and computer program product for reducing nuisance warnings during low altitude flight conditions and in the presence of low position uncertainty. The system includes a first component that determines whether the aircraft is in a low altitude flight condition and a second component that determines the position, positional uncertainty, and the heading. The system also includes a third component that attenuates and refines the look-ahead envelope in accord with the determined condition of flight and positional uncertainty.

14 Claims, 8 Drawing Sheets

VARIABLE ENHANCED GROUND PROXIMITY WARNING SYSTEM LOOK-AHEAD OFFSET AND SUB-OFFSET

PRIORITY CLAIM

This application claims priority from co-pending U.S. Provisional application Ser. No. 60/263,978 titled "Variable EGPWS Look Ahead Detection Offset and Sub-Offset," filed Jan. 24, 2001 the complete disclosure of which is incorporated herein by reference.

BACKGROUND OF THE INVENTION

An Enhanced Ground Proximity Warning System ("EGPWS") monitors several flight instrumentation inputs and refers to a database testing for the presence of ground proximity threats in the path of the aircraft. It does this by obtaining a reliable positional fix by means of receipt of Global Positioning System ("GPS") data augmented by other navigational data. Once the EGPWS obtains a reliable positional fix, the EGPWS refers to a terrain and obstacle database, augmented by an airport database (collectively "terrain"). Based upon the current position, the EGPWS identifies terrain hazards along the projected path of the aircraft.

The EGPWS identifies hazards along the projected path of the aircraft by defining a trio of parallel paths representing the projected flight path on the ground, known as the groundtrack, and a parallel path or offset track on either side of the groundtrack displaced by a distance known as a Look-Ahead Detection Offset. The EGPWS determines which data to recall from the database by determining which cells or sub-cells contain or touch points on any of the three lines. Additionally, the current practice is to extend the projected flight path outwardly by a small angle to detect and to warn of off-path terrain hazards that may be present. This splaying outward of the offset tracks enhances the pilot's recognition of hazards that, in the course of a turn, might present a terrain hazard. Side span is the term for this angle that splays the detection envelope. In current practice, neither the Look-Ahead Detection Offset nor the Side Span varies with positioning source accuracy.

The database in the EGPWS tiles the surface of the earth with database cells. These cells are defined in a manner to minimize variations in their size due to the curvature of the earth. Within each cell, the database subdivides the cells into sixteen sub-cells, each of which, in turn, the database divides into sixteen sub-sub-cells, depending upon the level of resolution of terrain information necessary to convey the hazards extant therein. The database stores the highest terrain altitude within a sub-sub-cell in association with that sub-sub-cell. The highest of the sixteen stored sub-sub-cell altitudes within a given sub-cell is stored in association with that sub-cell. Similarly, the highest of the sixteen contained sub-cell altitudes is stored in association with the cell. Depending upon the resolution setting of the EGPWS, each of the cells, sub-cells, or sub-sub-cells that the projected groundtrack and the two parallel tracks offset by the Look-Ahead Detection Offset, touches, the value stored in association with that cell is compared to the aircraft altitude. (Within this discussion, the terms cell and sub-cell refer to divisions within the database without regard to degrees of cell subordination divisions of cells, i.e., sub-cells may refer to any division of an existing division.) Where the value stored in association with an implicated sub-cell and the instantaneous altitude fall within preset limits in relation one to another, an alert will sound or flash on the display.

In current EGPWS, where the Look-Ahead Detection Offset is large compared to the database cell size, the three parallel paths might not implicate all of the sub-cells within the projected flight path. It is possible that where these three parallel paths are widely spaced and where the terrain differences are discontinuous and abrupt, a terrain obstacle will fall between the two of the three parallel paths, leaving that obstacle undetected.

With current EGPWS monitors, under low-level flight conditions, especially where mountainous terrain exists, off-path hazards might cause alarms that are not desirable. Additionally, where the positioning source accuracy is high, current EGPWS do not narrow the projected flight path by decreasing the Look-Ahead Detection Offset. Where the actual path is well-fixed, too great a Look-Ahead Detection Offset will result in off-path terrain causing alerts that will not be useful to the pilot. These are known as nuisance alerts.

If a nuisance alert is issued often enough, the operator may begin to ignore all EGPWS alerts, whether valid or not, thus compromising safety. The EGPWS would meet its objectives of safer flight if, rather than to ignore or to turn off the EGPWS, the EGPWS would use a narrower projection of the anticipated flight path. Terrain objects that are just outside of the narrower flight paths would not evoke alerts. With fewer alerts, the pilot would continue to attend to those remaining EGPWS alerts.

What is needed is a system that reduces nuisance alerts and that ensures that no terrain cells are missed within the Look-Ahead Detection Offset.

SUMMARY OF THE INVENTION

An improved enhanced ground proximity warning system, method and computer program product that reduces nuisance alarms is provided. The system includes a data bus component, a look-ahead component, a database component and an alert component. The data bus component provides a positional fix and a heading. The look-ahead component generates a look-ahead envelope defined by a detection offset value, a side span value and a series of detection sub-offsets. The database component comprises stored locations and elevations stored in association with those stored locations. The alert component generates an alert when an alert condition exists based upon the look-ahead envelope and the elevations retrieved from the database.

In accordance with further aspects of the invention, the data bus component comprises a low-altitude logical signal and a positional uncertainty value, and the look-ahead component includes a detection sub-offset generator. The detection sub-offset generator generates a series of sub-offsets whose number and magnitude are based on the presence or absence of a low-altitude logic signal and on the generated detection offset value.

In accordance will further aspects of the invention, the data base component comprises locations of runways. The look-ahead component will compare the instantaneous aircraft position with the stored locations of runways; select the nearest runway; and calculate the distance to that runway. Based upon the distance to nearest runway, the invention will select a side span value.

As will be readily appreciated from the foregoing summary, the invention provides an enhance ground proximity warning system that takes into consideration the presence of a low-altitude flight condition and positional uncertainty.

These considerations remove many of the nuisance alerts that exist in current enhanced ground proximity warning systems.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
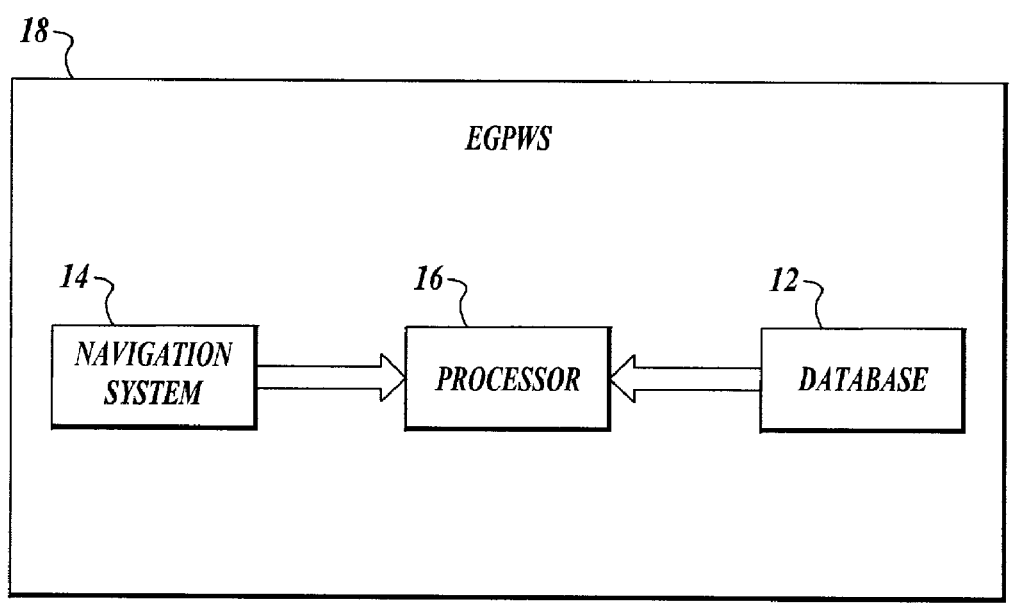
FIG. 1 is a block diagram of a system of the present invention.

As shown in FIG. 1, EGPWS provides a Look-Ahead terrain advisory and warning indications to the pilot of an aircraft of a hazardous flight condition. The EGPWS includes a processor 12, a navigation system 14, and a database 16. In operation, the processor 12 first fixes the position of the aircraft using navigational data from the navigation system 14, such as a global positioning system (GPS); or a Flight Management System ("FMS"). Once the processor 12 fixes the position of the aircraft, the processor 12 projects a flight path forward based upon aircraft ground track. This projected flight path, defines the terrain over which the processor 12 anticipates that aircraft will fly.

Having a projected flight path, the processor 12 then recalls highest elevations stored in a database in association with the terrain over which the processor 12 anticipates that the aircraft will fly and the terrain over which the offsets of the flight path will pass. The processor 12 adjusts the offsets and side span in response to the aircraft altitude, size of terrain cells, and aircraft distance from the runway. To do this, the processor 12 includes an airport database as well as a terrain database 16. Because of the processor 12 has varying needs for terrain information, the terrain database 16 contains various resolutions depending on the topography of the particular geographic area of interest or the quality and level of detail available for the terrain in question. Comparing the recalled elevations to the current altitude of the aircraft, the processor 12 determines which, if any, of terrain elevations recorded within the terrain database 16 that pose a threat to the aircraft in flight. A more complete definition of this process is set forth in U.S. Pat. No. 5,839,080, issued on Nov. 17, 1998 to Muller, et al. That patent is incorporated by this reference.

As indicated above, the PROCESSOR 12 requires a database containing references for all of the terrain proximate to the aircraft's flight path. This database is structured to provide varying resolutions of terrain data as a function of the topography of the terrain, as well as distance to airports. To define resolution, the database uses the dimensions of the sides of rectangular cells. For example, on an airport approach in close proximity to the runway where the aircraft will pass very close to the terrain, a relatively high resolution is useful. Using this same logic, the database can contain cells of a high resolution of approximately ¼ to ⅛ nautical miles representing terrain close to the airport and of a medium resolution, for example, from ½ to 1 nautical miles, will represent the remaining terrain within a 30-mile radius of the airport. Outside of the 30-mile radius from the airport, still a coarser resolution is sufficient.

Figure 2:
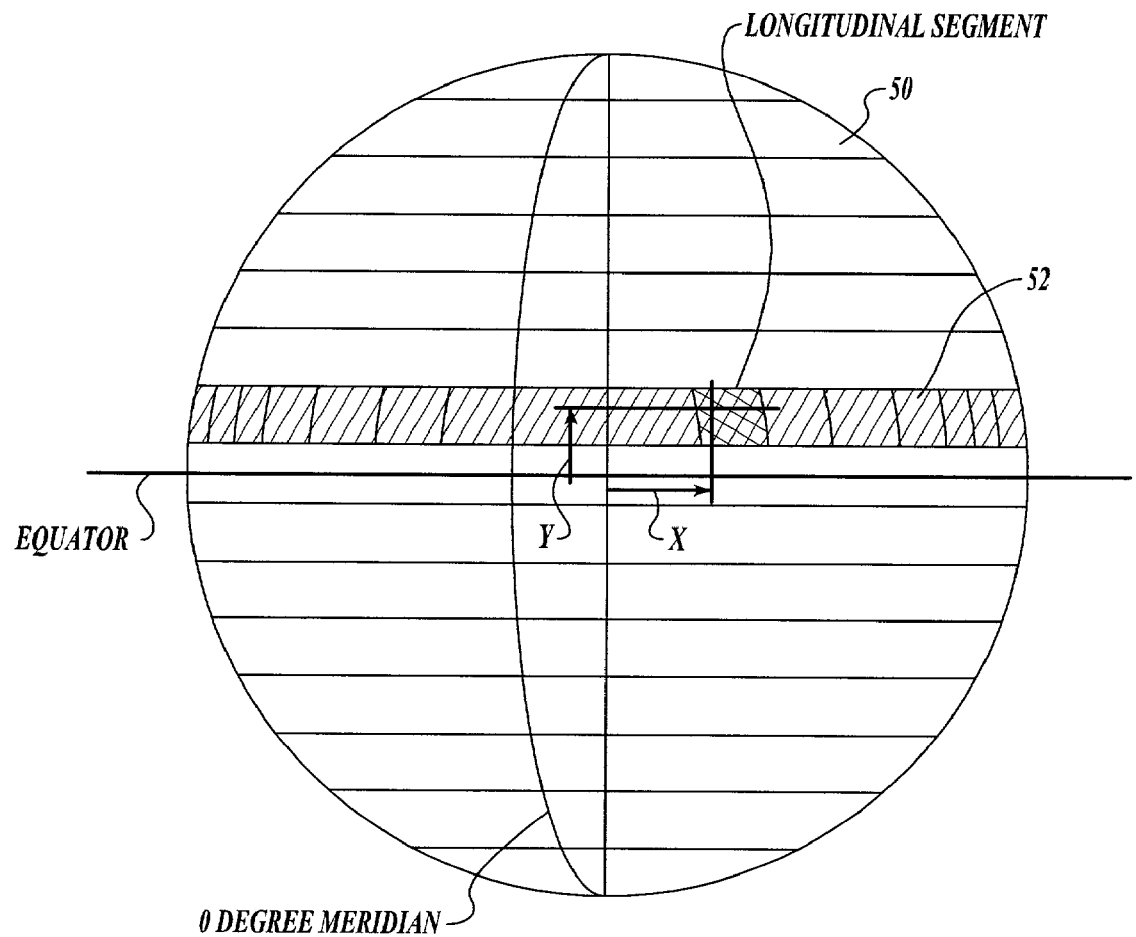
FIG. 2 is a graphic representation of the mapping method the present invention uses to generate the distinct cells of the database.

A single uniform method is necessary to map all of the likely terrain into the database. Traditional means of global positioning based upon latitude and longitude suggest themselves. Referring first to FIG. 2, the database 16 divides the earth's surface into a plurality of latitude bands 50, for example each representing about 4 degrees of latitude. Each latitude band 50 is then divided into a plurality of longitudinal segments 52, each segment representing about 4 degrees of longitude. At the equator, each longitudinal segment 52 is a square of about 256 nautical miles on a side. Based upon that equatorial model, all of the remaining cells are defined to maintain a relatively constant segment size. Thus, this scheme for defining segments of the earth's surface reduces the number of longitudinal segments 52 per latitude band 50 for bands closer to the poles.

Having defined the segments across the surface of the earth, the area within each segment is readily known. The latitude and longitude corresponding to the current aircraft position, specifically defines the segment containing the aircraft. For example, the aircraft over latitude X calls up the band 50 corresponding to X. Next, the processor 12 determines which of the longitudinal segments 52 associated with that band 50 contain the specific location either by way of a look-up table or by calculation.

Figure 3:
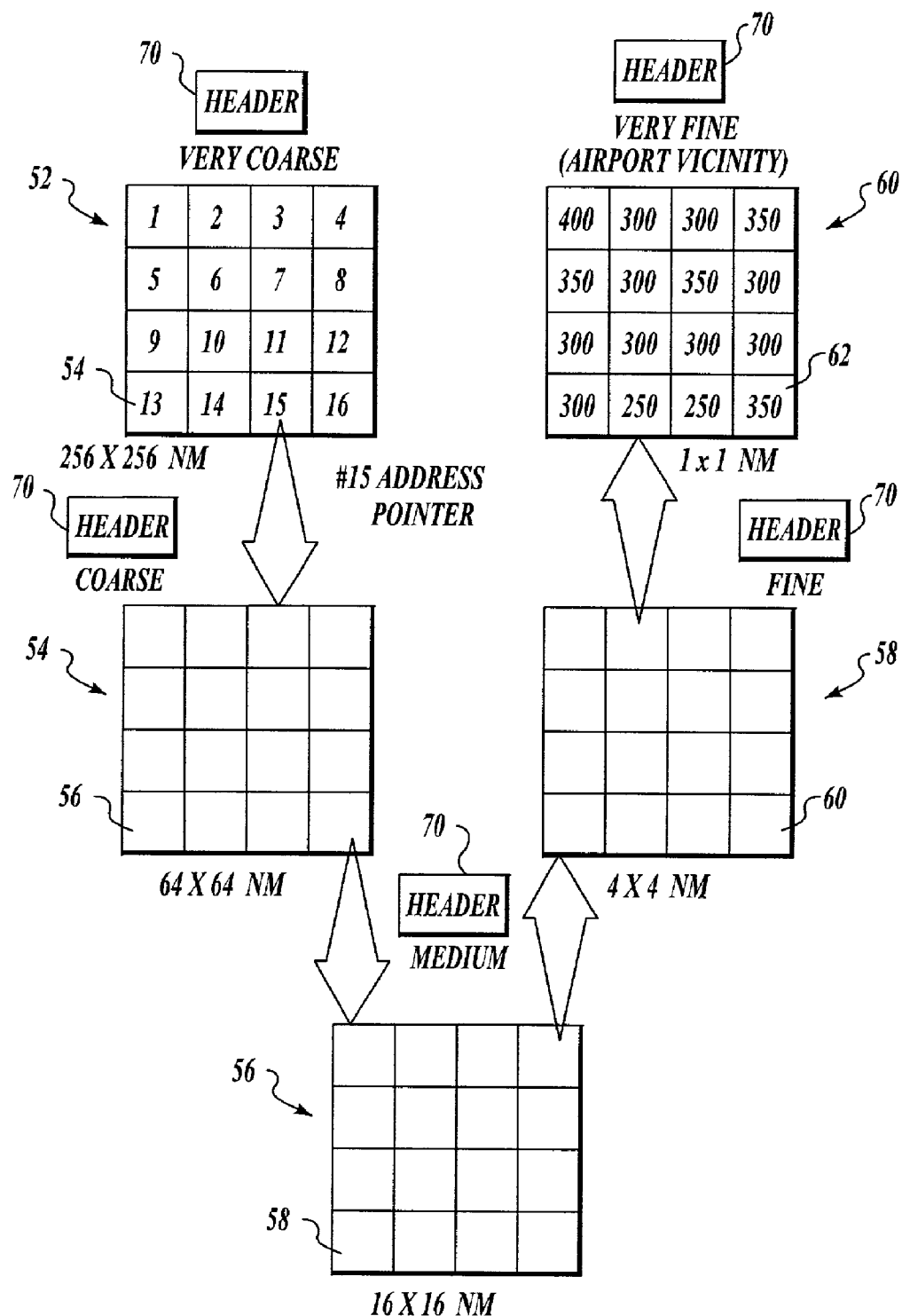
FIG. 3 is a graphic representation of the architecture and relationship of the stored information within the present invention database, specifically relating to the three levels of resolution of cells within database.

By this scheme, data associated with each longitudinal segment 52 corresponds to the highest altitude of terrain or obstacles within that segment. As mentioned above, each of the segments 52 is a square approximately 256 nautical miles on a side. As shown in FIG. 3, these longitudinal segments 52 can be broken down into various cells, and in turn, into sub-cells to provide varying levels of resolution. For example, the system breaks each segment 52 into a plurality of cells 54, each cell 54 being an approximate square of 64 nautical miles on a side to provide the processor 12 with a very coarse resolution. The cells 54, can, in turn, be further subdivided into a number of sub-cells 56, for example, each an approximate square of 16 miles on a side, to provide the processor 12 with a coarse resolution. Similarly, this same scheme can then further divide these sub-sub-cells into squares of 4 nautical miles (shown as 60), then of 1 nautical mile on a side (shown as 62). In the vicinity around airports, it may even be desirable to break down the sub-cells 60 down into smaller sub-cells 62 to provide even finer resolution, for example squares of ¼ nautical mile on a side.

Associated with each of these cells and sub-cells, the database contains a header 70 containing the reference altitude that corresponds to the highest altitude for cell or sub-cell respectively. This header might also include a flag to indicate when no further subdividing is required for certain geographical areas. For example, for segments representing the ocean, all sub-cells would have the same maximum altitude and thus no further subdividing would be required. For geographical areas, such as mountainous areas and areas in the vicinity of an airport, the longitudinal segments 52 are subdivided as discussed above.

Figure 4:
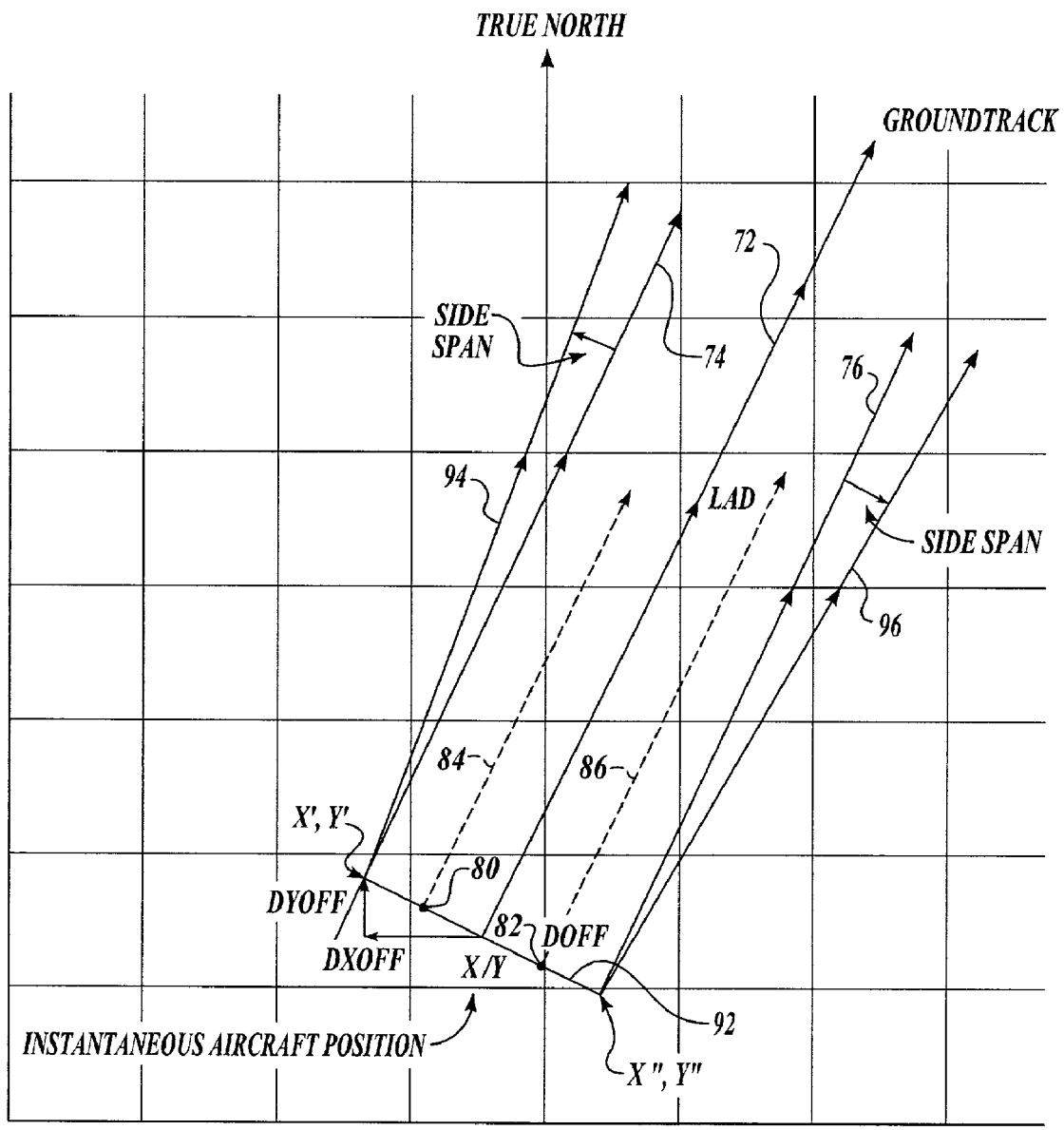
FIG. 4 is a graphic representation of the present invention.

FIG. 4 is a visualization of the method the EGPWS 20 of FIG. 1 for using the information in the terrain database for look-ahead terrain awareness. The position of the aircraft, its ground track, and its geometric altitude are determined outside of the PROCESSOR 12 and that data is available to the PROCESSOR 12. Projecting the aircraft along its current ground track and onto the earth's surface, yields a groundtrack 72. The ground track 72 is a line that passes through several database cells or sub-cells depending upon the resolution in use. As is evident from the preceding discussion the size of the relevant cell or sub-cell will vary with the type of terrain and the likely altitude of an aircraft passing over the terrain. The number of cells or sub-cells the groundtrack 72 passes through is limited by the Look-Ahead Distance ("LAD") as the processor 12 determines according to current methods.

Current processor 12 determines a detection offset 92 suitable to the aircraft. With that offset, the processor 12 will determine two parallel tracks to the groundtrack 72. For instance, if the aircraft is at point (X, Y) and heading along and above groundtrack 72, displacing the instantaneous position of aircraft (X, Y) by the detection offset 92 to in each direction perpendicular to the groundtrack 72 results in two new points (X', Y') and (X", Y"). Transposing the groundtrack to each of these two new points, results in two parallel tracks, 74 and 76 respectively. Each passes through a number of discrete cells or sub-cells.

To widen the detection path, the processor 12 splays the scope of the detection by offsetting the two parallel tracks 74 and 76 by a small configurable angle resulting in tracks 94 and 96. Similarly, these tracks pass through a number of additional discrete cells or sub-cells. When the ground track 72, offsets 74 and 76, and side spans 94 and 96 are used together, each movement of the aircraft evokes the recalling those altitudes associated with a pattern of cells around the aircraft.

The present invention enhances and also attenuates that pattern of recalled altitudes under specific circumstances, particularly low altitude flight. The unlike the present invention a current processor 12 does not change the magnitude of the detection offset 92 when the resolution becomes finer where appropriate. With finer sub-cell divisions, whole sub-cells might be missed by the groundtrack, the parallel tracks, and the side span tracks.

One embodiment of the present invention implements a plurality of sub-offsets 80 and 82 equally spaced between the groundtrack and the two offset tracks 94 and 96, from the instantaneous aircraft position. Additional parallel tracks, 84 and 86, for example, originating at each of these new sub-offset points 80 and 82, pass through many more cells or sub-cells. The processor 12 selects sub-offsets in a manner such that sub-offset distances are smaller than the finest resolution the processor 12 uses; the processor 12 will recall elevations from all of the cells between the two offset tracks. In FIG. 4, only two such sub-offset tracks 84 and 86 are shown, though any suitable number would work. In augmenting the current practice, a maximum of four such sub-offsets are used on each side, but faster processors will be able to work at finer and finer resolutions resulting in greater numbers of sub-offsets.

Another embodiment of this same invention addresses the side spans 94, 96. In current operation, the processor 12 uses a small angle of between one and three degrees to splay out the side spans 94, 96. This angle is currently set by configuring a variable, which then remains constant throughout the time the processor 12 resides in the airframe. The angle does not vary with conditions of flight or with proximity to the airport. Just as in the prior discussion of the width of the offsets, decreasing the side span angle in some conditions of flight would reduce the number of nuisance alerts that might occur due to the detection of off-track hazards. In the present invention, thus, when the PROCESSOR 12 detects conditions of low level flight, based upon the inputs from the data bus, the PROCESSOR 12 will set the side span angle to zero.

Figure 5:
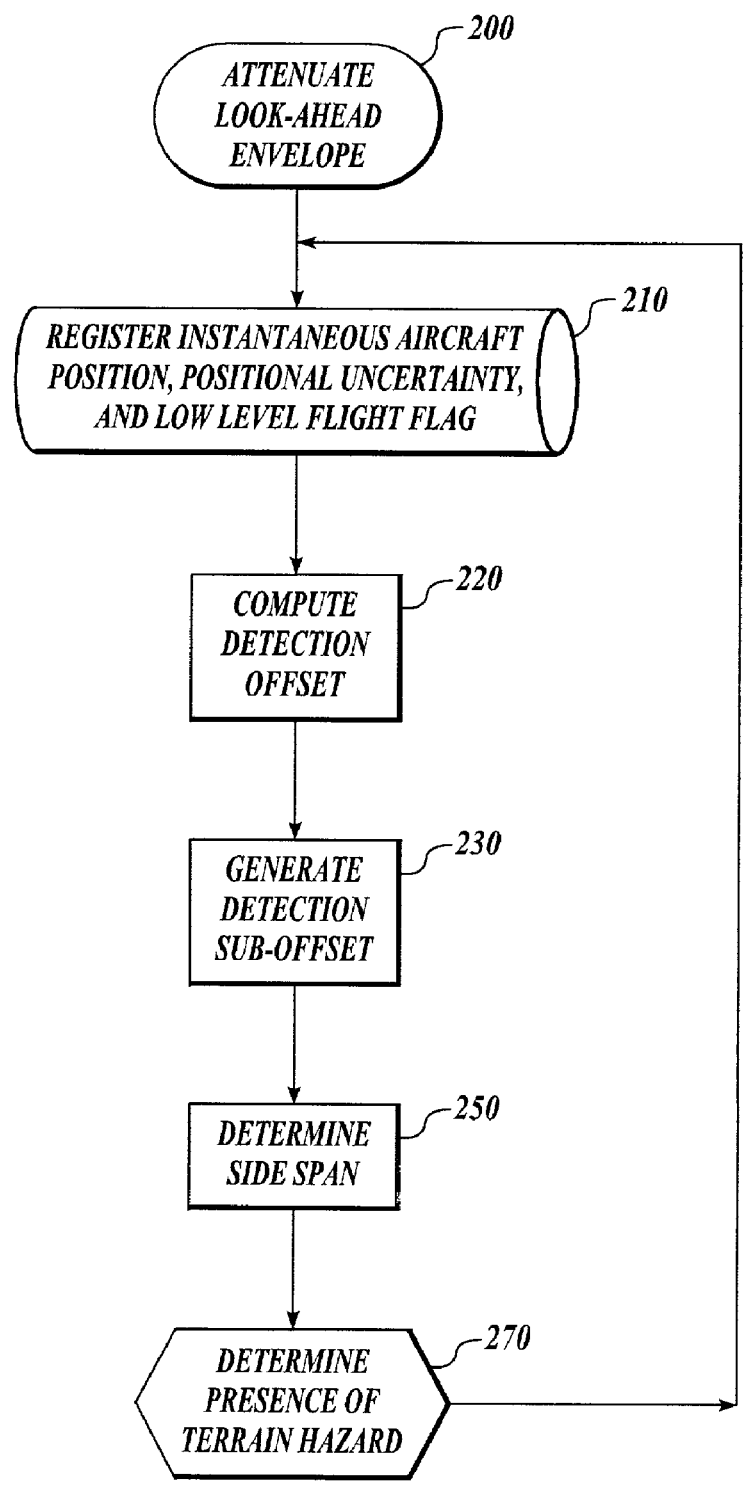
FIG. 5 is a flow chart describing the inventive method performed by the system of the present invention.

FIG. 5 indicates a preferred method 200 of the present invention. In order to attenuate the Look-Ahead envelope, first the processor 12 draws data about the flight condition of the aircraft from the flight instrumentation of the aircraft at 210. The processor 12 receives geometric altitude, radio altitude, and the GPS altitude from the flight instrumentation within the cockpit of the aircraft, as well as ground track, speed, attitude, and positional uncertainty. From the constellation of these data, the processor 12 determines the conditions necessary for setting the low-altitude-flight indication flag. In addition, at 210, the processor 12 stores position, heading, and positional uncertainty directly from the instrumentation.

After registering the flight condition data, the processor 12 computes the necessary detection offset at 220 according to the method set out at FIG. 5. Given the computed offset, the positional uncertainty, the database resolution at the instantaneous aircraft position, and the presence or absence of the low-altitude-flight indication flag, the PROCESSOR 12 subdivides the computed detection offset into one or more sub-offsets 230 according to the method set forth in FIG. 7. The processor 12 then computes the distance to the nearest runway and, again, recognizes the presence or absence of the low-altitude-flight indication flag and accordingly sets the side span of the look-ahead envelope at 250. Having determined the dimensions of the attenuated look-ahead envelope, the processor 12 examines the now attenuated look-ahead envelope according to the methods of the current EGPWS at 270.

Figure 6:
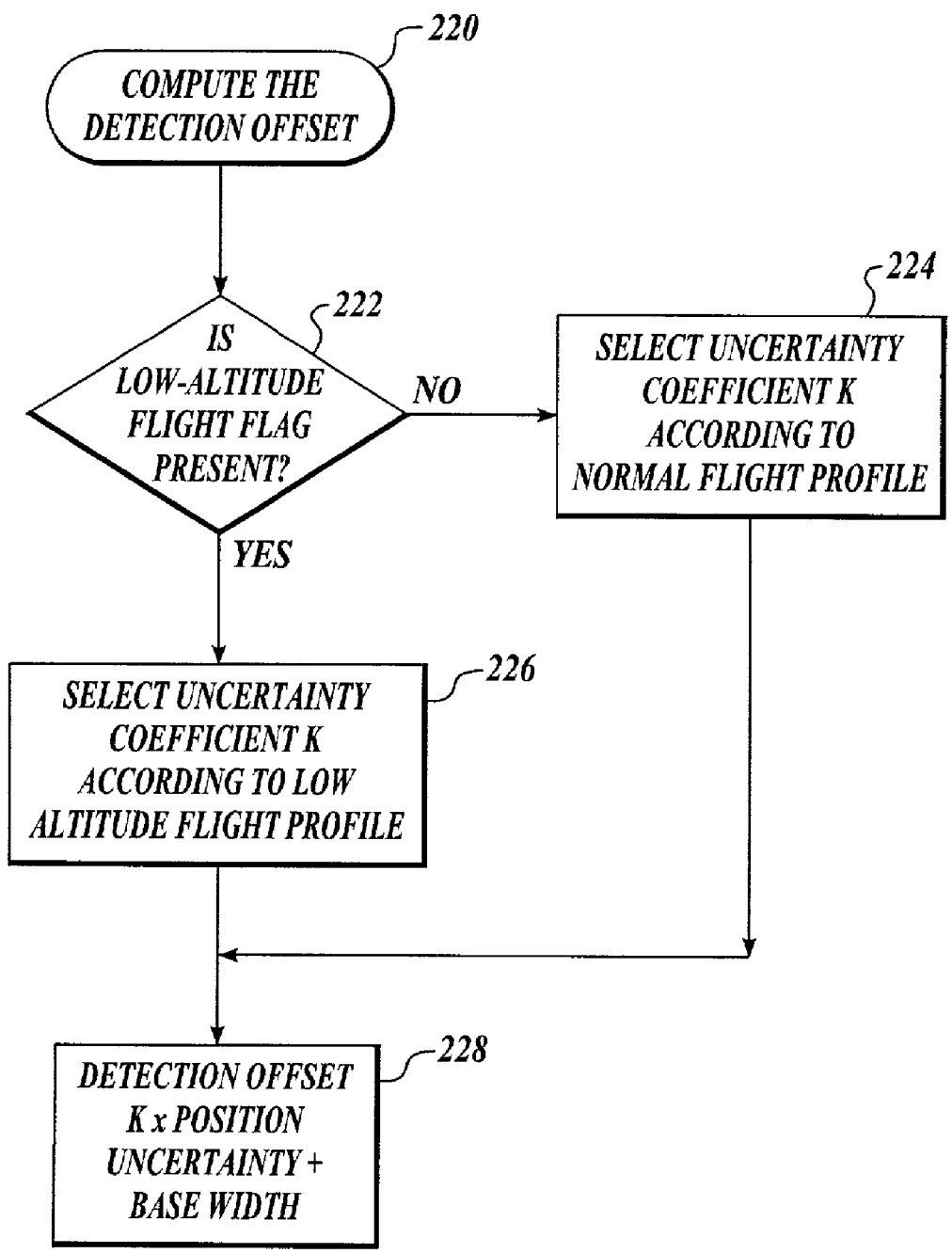
FIG. 6 is a method for computing Detection Offset as the method set forth FIG. 5 requires.

FIG. 6 indicates a preferred method 220 of computing the detection offset 92. First, as above, the PROCESSOR 12 must determine if the aircraft is in a low-altitude flight condition at 222. In the event that the aircraft is in a low-altitude flight, the processor 12 selects a lower coefficient (in a preferred embodiment, this coefficient is one or 1) consistent with a smaller offset from the ground track at 226. If the aircraft is not in low-altitude flight, the processor 12 uses a larger coefficient (in a preferred embodiment, this coefficient is one and one-half or 1.5) consistent with a larger offset at 224.

Having selected the suitable coefficient, at 228, the processor 12 multiplies the measure of positional uncertainty by the selected coefficient to produce a product. This product roughly reflects a "margin of error" defining a given flight condition and positional uncertainty. The selection of the coefficient might include configuring the coefficient with suitable correction factors depending upon what measure of positional uncertainty the processor 12 uses. To this margin of error, the processor 12 adds the base width to arrive at the suitable offset 228. The base width is the minimum lateral clearance necessary for safe flight.

In one embodiment of the present invention, the positional uncertainty the PROCESSOR 12 uses is the Horizontal figure of merit ("HFOM"). The advantage is that the HFOM is directly available from the GPS in the calculation of position. The HFOM estimates the quality of the satellite reception from certain data including "residuals" and the latency of the differential corrections. The GPS applies a HFOM to each reading, so that if the reading is good—within a selected figure of merit limit, it is used or if the reading is bad—outside the selected figure of merit limit, it is omitted. The figure of merit is measured in meters and ranges from 1 to about 300; preferably less than 10.

The HFOM is the GPS's best estimate of the possible error in its position solution given the information available to it at that specific time. It is an indication of the confidence in the positional fix, varying as it does, inversely with the precision of the fix. A higher HFOM is indicative of lower confidence but it does not mean that the position solution is actually that far off, it could be "dead on".

The computed detection offset 92 determines the outer edges of the "trident" formed by the groundtrack and the parallel offset tracks as illustrated in FIG. 4. Once that width is determined, the PROCESSOR 12 selects the number and position of the remaining "tines" to the trident, i.e. the sub-offsets for more parallel tracks. To that end, FIG. 7 describes the steps necessary to determine the magnitude of the detection sub-offsets 230.

Figure 7:
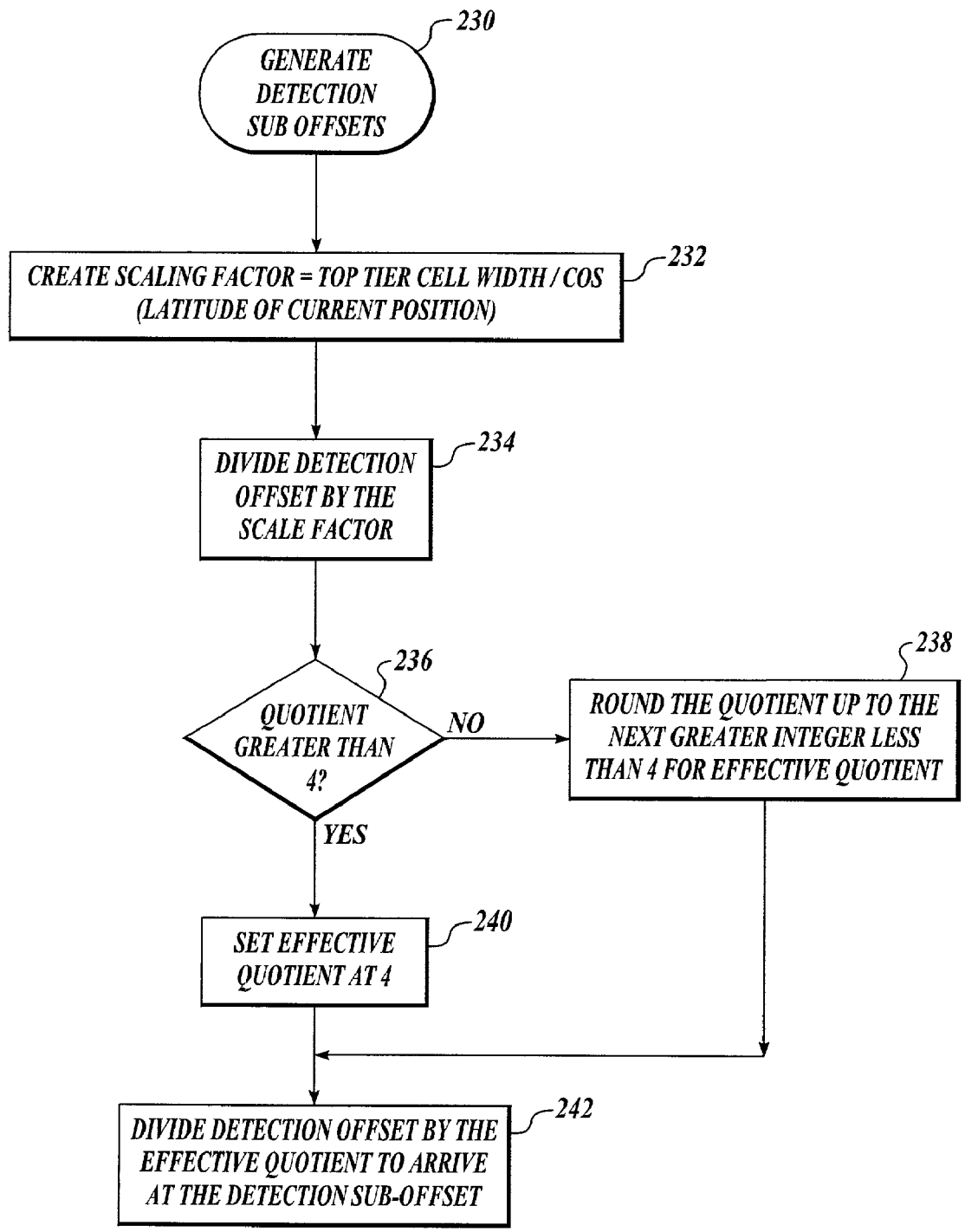
FIG. 7 is the method for determining Detection Sub-Offset as the method set forth FIG. 5 requires.

In FIG. 7, the method of generating detection sub-offsets 230 depends upon the resolution of the database at the point of the instantaneous aircraft position. When describing the database necessary to describe the terrain of the surface of the earth above, the database placed a flag in the data when database reached the finest resolution available. This level of resolution defines the "top tier" applicable to a particular geographic location represented in the database. In every instance, there is a finest resolution available at this flagged level. That resolution might be 16 nautical miles in some instances, in others it might be as little as ¼ nautical mile. This distance is known as the "top tier cell width."

The instantaneous aircraft position defines the applicable top tier and, in turn is defined by its latitude and longitude. The longitude is an indication of the interior angle between the instantaneous aircraft position with respect to the equator. It is essentially angular displacement on the surface of the earth from the equator; the poles being ninety degrees displaced from the equator.

The size of the cells does not vary greatly from equator to pole because of design constraints of the database as described above. Because these cells were designed to contain data about similar area sections of the earth's surface, these cells turn progressively more obliquely to the axis of rotation as they are displaced from the equator. To equalize these cells, the processor 12 divides each top tier cell-width by the cosine of the latitude describing the aircraft's instantaneous position at 232. The resulting quotient is a scaling factor for the calculation of the detection offset.

The scaling factor is a rough approximation of the necessary separation of sub-offsets that are necessary between the groundtrack and each of the two detection offset tracks to properly strike each of the top tier cells within a "trident" defined by the groundtrack 72 and the offset tracks 74 and 76. To place the sub-offset tracks, the offset is then divided by this scaling factor to arrive at a number of sub-offset tracks the processor 12 will place between the offset tracks and the groundtrack at 234. The preferred embodiment caps this number at a maximum of four sub-offset tracks at 236, but with finer and finer resolution, as might be available with faster processors, a larger number of sub-offsets might be appropriate.

Where the maximum number of sub-offsets indicated by dividing the offset by the scaling exceeds the maximum at 236, in this case four, the effective quotient is set at that maximum at 240. In all other instances 238, where the resulting quotient from dividing the offset by the scaling factor is not an integer that quotient the processor 12 rounds the quotient to the next greater integer. The rounded quotient indicates how many sub-offset tracts the Processor 12 will place between the groundtrack 72 and the detection offset track 74, 76. The detection offset 92 is divided by the effective quotient to arrive at a sub-offset distance at 242.

Figure 8:
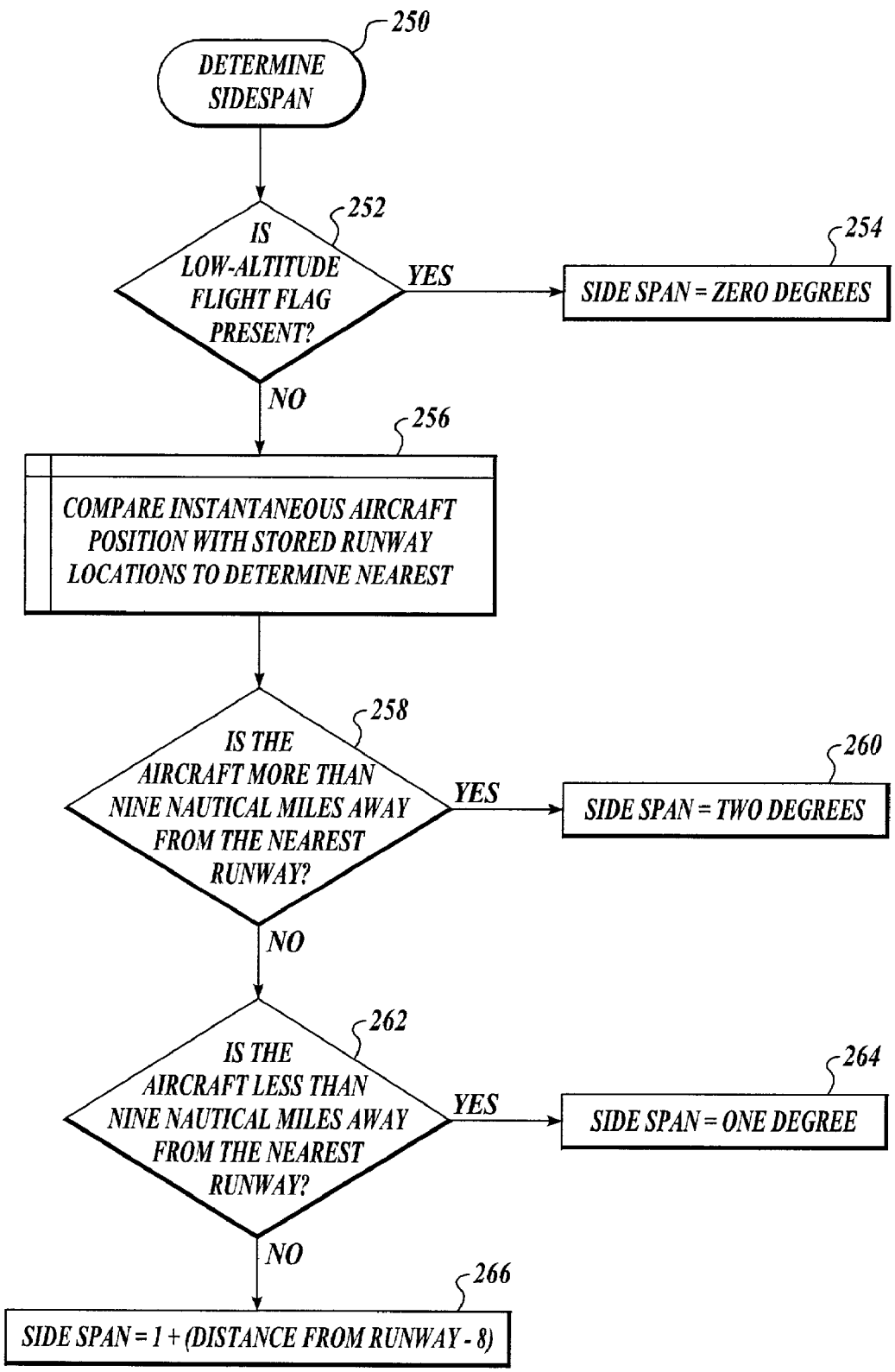
FIG. 8 is the method for determining Side Span as the method set forth FIG. 5 requires.

In FIG. 8, the processor 12 determines the appropriate side span 710. As in the preceding subroutines, the first step is 252 determining the presence of the low-altitude-flight flag in the register. If the low-altitude-flight flag is present, the side span is immediately set to zero degrees in order to minimize nuisance alarms for off-path hazards at 254. Where the aircraft is not in low-altitude flight, the distance to the nearest runway determines the side span appropriate to flight according to a configurable profile. In this embodiment, for distances less than 8 nautical miles the side span is set to one degree of spread. For distances greater than 9 nautical miles, the side span is set to two degrees. For distances between 8 and 9 nautical miles, the side span varies linearly with the distance between one and two degrees.

The processor 12 compares the instantaneous aircraft position with the stored runway locations at 256. The processor 12 sorts runways by distance from the instantaneous aircraft position and then calculates the distance to the nearest runway, i.e. the offset from the nearest runway. This sorting occurs each time the processor 12 updates the instantaneous aircraft position.

If the aircraft instantaneous position is offset from the nearest runway by more than nine nautical miles at 258, the processor 12 sets the side span at two degrees at 260. If, on the other hand, the aircraft instantaneous position is offset less than eight nautical miles at 262, the side span is set to one degree at 264. Where the offset is between eight and nine nautical miles, the processor 12 sets the side span in degrees to a number equal to the distance from the runway in nautical miles minus seven (one minus eight) at 266. This allows for a smooth transition from the wider search area used for normal altitude cruising and the narrow search implicated in approach.

While the preferred embodiment of the invention has been illustrated and described, as noted above, many changes can be made without departing from the spirit and scope of the invention. For example, rather than setting the side span to vary at an offset between the runway and the instantaneous aircraft position of between seven and ten nautical miles rather than between eight and nine nautical miles. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for generating a look-ahead envelope defined, in part by detection offsets for use by an enhanced ground proximity warning system in an aircraft, the method comprising:
   providing a terrain database;
   receiving a positional fix;
   determining a database resolution at the positional fix, wherein the positional fix includes at least one of a positional uncertainty value, a distance to nearest runway value, or a logical signal indicating a low-altitude flight condition;
   receiving a ground track;

generating a look-ahead envelope based on the received positional fix, data base resolution, and the received heading, wherein generating comprises determining detection offset of the look-ahead envelope based on at least one of the positional uncertainty value, the distance to nearest runway value, or the logical signal indicating a low-altitude flight condition.

2. The method of claim 1, wherein generating comprises generating a series of detection sub-offsets based on the value for positional uncertainty.

3. The method of claim ,1 wherein generating comprises generating a side span value based on the distance to nearest runway.

4. The method of claim 1, wherein generating comprises generating a side span value based upon the presence of the logical signal indicating a low-altitude flight condition.

5. The method of claim 1, wherein generating comprises determining the detection offset based upon the presence of the logical signal indicating a low-altitude flight condition.

6. The method of claim 1, wherein generating comprises generating a series of detection sub-offsets based upon the presence of data base high-resolution.

7. An enhanced ground proximity warning system in an aircraft comprising:
a data bus configured to receive information from navigational instrumentation including a global positioning system; and
a look-ahead component configured
to receive a positional fix and a ground track from the data bus, wherein the positional fix comprises at least one of a measure of positional uncertainty or a logical signal indicating a low-altitude flight condition;
to generate a look-ahead envelope defined, in part, by:
detection offsets ; and
side span angles,
wherein the look-ahead component generates the detection offsets based upon at least one of the measure of positional uncertainty, or the presence of a logical signal indicating low-altitude flight condition.

8. The system of claim 7, wherein the look-ahead component generates a series of detection sub-offsets based upon the presence of the logical signal indicating low-altitude flight condition.

9. An enhanced ground proximity warning system in an aircraft comprising:
a means for conveying data from navigational instrumentation including a global positioning system; and
a means for generating a look-ahead envelope based upon
a positional fix received from the means for conveying data; and
a heading received from the means for conveying data,
wherein the means for generating a look-ahead envelope further bases that envelope upon at least one of a measure of positional uncertainty or a logical signal indicating a low-altitude flight condition received from the means for conveying data.

10. A computer program product for use in an aircraft comprising:
a register for receiving navigation data comprising:
a positional fix of the aircraft; and
a ground track of the aircraft; and
at least one of a positional uncertainty value or a logical signal indicating low-altitude flight;
a look-ahead component configured to generate a look-ahead envelope based on the positional fix of the aircraft and the heading of the aircraft, wherein a width of the look-ahead envelope is based upon the detection offset value, wherein the look-ahead component is configured to generate the detection offset value based upon at least one of the positional uncertainty value or the logical signal indicating low-altitude altitude flight;
a database component comprising stored elevations of terrain stored in association with a terrain location for locations along an anticipated flight path;
an alert component configured to determine if an alert condition exists based on the generated look-ahead envelope and the stored elevations of terrain.

11. The product of claim 10, wherein the look-ahead envelope is further defined by a side span value wherein a splay of the look-ahead envelope is based upon the side span value.

12. The product of claim 11 wherein the look-ahead component selects a side span value based on the presence of the logical signal indicating low-altitude flight.

13. The product of claim 10, wherein the look-ahead envelope is further defined by a side span value and wherein the look-ahead component generates a side span value.

14. The product of claim 13, wherein the database further comprises locations of runways and wherein the look-ahead component is configured to:
compare stored locations of runways to an aircraft instantaneous position;
select a nearest runway based upon the compared locations of runways;
calculate the distance to the nearest runway value; and
generate the side span value further based upon the distance to nearest runway value.

* * * * *